(12) United States Patent
Loughlin

(10) Patent No.: US 12,612,817 B2
(45) Date of Patent: Apr. 28, 2026

(54) DOOR STOP REPAIR DEVICE

(71) Applicant: Patrick Loughlin, Boca Raton, FL (US)

(72) Inventor: Patrick Loughlin, Boca Raton, FL (US)

( * ) Notice: Subject to any disclaimer, the term of this patent is extended or adjusted under 35 U.S.C. 154(b) by 0 days.

(21) Appl. No.: 18/507,823

(22) Filed: Nov. 13, 2023

(65) Prior Publication Data

US 2024/0167619 A1    May 23, 2024

Related U.S. Application Data

(60) Provisional application No. 63/426,091, filed on Nov. 17, 2022.

(51) Int. Cl.
*E05F 5/06* (2006.01)
*F16M 13/02* (2006.01)

(52) U.S. Cl.
CPC .............. *E05F 5/06* (2013.01); *F16M 13/02* (2013.01)

(58) Field of Classification Search
CPC .............. E05F 5/06; E05F 5/02; F16M 13/02
See application file for complete search history.

(56) References Cited

U.S. PATENT DOCUMENTS 343,298 A * 6/1886 Conn ..................... E05C 17/446
292/193
859,459 A * 7/1907 McCauley ........... E05C 19/063
292/17

1,354,469 A * 10/1920 Daniele ..................... E05F 5/06
16/86 A
2,109,228 A * 2/1938 Carlson ................. E05C 17/525
292/DIG. 28
2,311,278 A * 2/1943 Johnson ..................... E05F 5/06
16/86 A
2,462,174 A * 2/1949 Fisher ........................ E05F 5/06
16/86 A
2,899,703 A * 8/1959 Johnson ..................... E05F 5/06
16/86 A
3,180,666 A * 4/1965 Jorgensen ............... E05C 17/52
403/90
3,300,239 A * 1/1967 Dinkin .................... E05C 17/56
292/251.5

(Continued)

FOREIGN PATENT DOCUMENTS

CN 202152578 * 2/2012
WO WO-2017117628 A1 * 7/2017 ............. E05C 17/56

*Primary Examiner* — Eret C Mcnichols

(57) ABSTRACT

A door stop repair device is presented. The device includes a door stop mounting plate. The door stop plate further includes a raised portion, wherein the raised portion is configured to allow a surface-to-surface mating between a bottom portion of a door stop and a top surface of the raised portion of the door stop mounting plate. The door stop mounting plate includes an underside cavity. The door stop repair device includes an elastomeric retaining element. The elastomeric retaining element is configured to allow thread engagement with a screw associated with a door stop. The elastomeric retaining element is configured to be position-able within the cavity on the underside of the door stop mounting plate. The elastomeric retaining element is further configured to secure the door stop to the door stop mounting plate when the door stop is fastened to the elastomeric retaining element.

7 Claims, 11 Drawing Sheets

(56) References Cited

U.S. PATENT DOCUMENTS

| 3,386,125 | A | * | 6/1968 | Hand | E05F 5/06 |
| | | | | | 16/42 R |
| 3,484,891 | A | * | 12/1969 | Borgen | E05F 5/06 |
| | | | | | 16/86 A |
| 3,864,785 | A | * | 2/1975 | Hoppock | F16F 1/422 |
| | | | | | 16/86 A |
| 3,969,786 | A | * | 7/1976 | Peak | E05F 5/06 |
| | | | | | 16/86 A |
| 3,994,043 | A | * | 11/1976 | Gurzenda | E05F 5/06 |
| | | | | | 16/86 A |
| 4,218,807 | A | * | 8/1980 | Snow | E05F 5/08 |
| | | | | | 292/DIG. 19 |
| 4,505,502 | A | * | 3/1985 | Tomita | E05C 17/56 |
| | | | | | 292/347 |
| 4,532,672 | A | * | 8/1985 | Anderson | E05F 5/06 |
| | | | | | 16/86 A |
| D288,291 | S | * | 2/1987 | Angle | D8/402 |
| D288,525 | S | * | 3/1987 | Angle | D8/352 |
| 4,782,553 | A | * | 11/1988 | Morrison | E05F 5/02 |
| | | | | | 267/140 |
| 5,010,622 | A | * | 4/1991 | Morita | E05C 17/56 |
| | | | | | 292/DIG. 19 |
| 5,082,317 | A | * | 1/1992 | Delaney, Jr. | E05C 17/56 |
| | | | | | 292/DIG. 19 |
| 5,603,141 | A | * | 2/1997 | Gledhill | E05F 5/06 |
| | | | | | 16/86 A |
| 5,944,368 | A | * | 8/1999 | Hastings | E05C 17/56 |
| | | | | | 292/DIG. 19 |
| 6,295,697 | B1 | * | 10/2001 | Simon | E05F 5/02 |
| | | | | | 16/86 A |
| 6,430,775 | B1 | * | 8/2002 | Bushey | E05F 5/06 |
| | | | | | 16/86 A |
| 7,024,726 | B1 | * | 4/2006 | Cornell | E05F 5/06 |
| | | | | | 292/340 |
| 7,412,751 | B2 | * | 8/2008 | Forrest | E05F 5/06 |
| | | | | | 16/85 |
| 9,267,317 | B2 | * | 2/2016 | Vu | E05F 5/06 |
| 9,631,667 | B2 | * | 4/2017 | Rodenhouse | F16B 43/00 |
| 10,352,082 | B1 | * | 7/2019 | Shuba, Jr. | E05F 5/08 |
| 10,400,496 | B2 | * | 9/2019 | Kuta | E05C 17/56 |
| 10,662,685 | B2 | * | 5/2020 | Proetta | E05C 17/446 |
| D933,468 | S | * | 10/2021 | Hancock | E05F 5/02 |
| | | | | | D8/402 |
| 11,828,102 | B2 | * | 11/2023 | Brant | E06B 1/6076 |
| 2004/0045128 | A1 | * | 3/2004 | Frushour | E05F 5/06 |
| | | | | | 16/82 |
| 2007/0163077 | A1 | * | 7/2007 | Yang | E05F 5/06 |
| | | | | | 16/85 |
| 2017/0175427 | A1 | * | 6/2017 | Wirth | E05B 47/004 |
| 2024/0003172 | A1 | * | 1/2024 | Zannoni | E05C 17/02 |

* cited by examiner

DOOR STOP REPAIR DEVICE

RELATED APPLICATIONS

This application claims priority to U.S. Provisional Application No. 63/426,091 filed Nov. 17, 2022. The entire contents of the above application are hereby incorporated by reference as though fully set forth herein.

FIELD OF THE INVENTION

The present invention relates generally to screw hole repair systems, and more particularly, to door stop repair devices which provide a user the ability to economically and efficiently repair worn-out door stop screw holes in order to utilize the original door stop with the repaired hole.

BACKGROUND OF THE INVENTION

Many methods and systems have been used in unsuccessful attempts to repair worn out screw holes for standard door stops. These systems and methods have not been reliable or effective. Many of the unsuccessful systems are cumbersome, costly and fail to provide a universal common device or kit to repair most worn-out screw hole situations.

As the construction industry continues developing, interior decorators quite often choose designer door stops and/or specialty woods in their interior door designs in commercial and residential settings. Once a door stop screw hole becomes worn out or damaged common standard repair techniques sometimes require utilizing additional larger size screw posts to replace the original post. Quite often, the unique design of the posts make finding an appropriate larger screwed post difficult. Further, specialty woods and/or designs are often used on door designs, wall designs, and door moldings making interfacing with these unique surfaces and materials difficult to match with existing repair materials.

Quite often, current repair methodologies require a new larger screw or drilling a new hole for the original post screw. These evolutions require damaging existing surrounding areas and/or new hardware. These solutions can be expensive, time consuming, and render the affected areas further modified from the original design.

Additionally, past attempts have failed to provide a singular device for a user to use in any environment to effectively repair worn-out screw holes, utilizing the original door stop post and screw, and without aesthetically affecting the surfaces of the door and the wall or molding in the area around the worn-out screw hole.

Accordingly, there is an established need for a worn-out screw hole repair system which solves at least one of the aforementioned problems. Further, there is an established need for a door stop repair device which can address providing an effective and economical repair utilizing the original door stop post with screw and not aesthetically affecting the area surrounding the worn-out hole on the door and/or the wall and/or molding.

SUMMARY OF THE INVENTION

According to an aspect of the present invention, door stop repair devices are provided. These innovations include new, useful, and non-obvious systems which provide a user of the system to repair worn-out door stop screw holes and utilize the original door stop post and screw and not aesthetically affect the surrounding area around the worn-out hole on the door, wall, and molding.

In another aspect of the present invention, a door stop repair device suitable for use in utilizing an existing door stop in a location wherein an original door stop screw hole has worn out is presented. The device includes a door stop mounting plate. The door stop mounting plate also includes a plurality of openings, the openings located around edges of the door stop mounting plate. The door stop plate further includes a raised portion, wherein the raised portion is configured to allow a surface-to-surface mating between a bottom portion of a door stop and a top surface of the raised portion of the door stop mounting plate. The door stop mounting plate additionally includes an underside of the door stop mounting plate with a cavity. The door stop repair device includes an elastomeric retaining element. The elastomeric retaining element is configured to allow thread engagement with a screw associated with a door stop.

The elastomeric retaining element is configured to be positionable within the cavity on the underside of the door stop mounting plate. The elastomeric retaining element is further configured to secure the door stop to the door stop mounting plate when the door stop is fastened with the door stop screw to the elastomeric retaining element. The door stop repair device also includes a plurality of securing fasteners, wherein the plurality of securing fasteners are configured to secure the door stop mounting plate to a surface using the plurality of door stop mounting plate openings. Further, the door stop repair device securely holds in place the door stop in or about the original door stop hole location when the four securing fasteners are fastened to the surface, the door stop screw is fastened to the elastomeric retaining element, and wherein the elastomeric retaining element is positioned within the cavity on the underside of the door stop mounting plate, forming a secure fastening of the door stop in or about the location of the original door stop screw hole.

Additionally, in further aspects a door stop repair device suitable for use in utilizing an existing door stop in a location wherein an original door stop screw hole has worn out is presented. The door stop device includes a door stop mounting plate. The door stop mounting plate includes a plurality of openings, the openings located around edges of the door stop mounting plate. The door stop mounting plate also includes a perforation positionable about a center of the door stop mounting plate. The door stop mounting plate is further configured to secure the door stop to the door stop mounting plate when the door stop is fastened with the door stop screw to the perforation. The door stop repair device also includes a plurality of securing fasteners, wherein the plurality of securing fasteners are configured to secure the door stop mounting plate to a surface using the plurality of door stop mounting plate openings.

Accordingly, the door stop repair device securely holds in place the door stop in or about the original door stop hole location when the plurality of securing fasteners are fastened to the surface, the door stop screw is fastened to the door stop mounting plate, forming a secure fastening of the door stop in or about the location of the original door stop screw hole.

In an embodiment of the present invention, a door stop repair device suitable for use in utilizing an existing door stop in a location wherein an original door stop screw hole has worn out is presented. The device includes a door stop mounting plate. The device also includes a door stop plate which includes a raised portion, wherein the raised portion is configured to allow a surface-to-surface mating between a bottom portion of a door stop and a top surface of the raised portion of the door stop mounting plate. The device further includes an underside of the door stop mounting plate which also includes a cavity. The device can include an elastomeric retaining element. The device can also include an elastomeric retaining element which is configured to allow thread engagement with a screw associated with the door stop.

The device further includes an elastomeric retaining element which is configured to be positionable within the cavity on the underside of the door stop mounting plate. The device includes an elastomeric retaining element which is further configured to secure the door stop to the door stop mounting plate when the door stop is fastened with the door stop screw to the elastomeric retaining element. The device is also configured so that the door stop repair device securely holds in place the door stop in or about the original door stop hole location when a bottom surface of the door stop mounting plate is affixed to the surface, the door stop screw is fastened to the elastomeric retaining element, and wherein the elastomeric retaining element is positioned within the cavity on the underside of the door stop mounting plate, forming a secure fastening of the door stop in or about the location of the original door stop screw hole.

Additionally, in further aspects a door stop repair device suitable for use in utilizing an existing door stop in a location wherein an original door stop screw hole has worn out is presented. The door stop device includes a door stop mounting plate. The door stop mounting plate also includes a perforation positionable about a center of the door stop mounting plate. The door stop mounting plate is further configured to secure the door stop to the door stop mounting plate when the door stop is fastened with the door stop screw to the perforation.

Accordingly, the door stop repair device securely holds in place the door stop in or about the original door stop hole location when the door stop screw is fastened to the door stop mounting plate, forming a secure fastening of the door stop in or about the location of the original door stop screw hole.

The door stop repair device can also include door stop mounting plates with dimensions of about 1.52 inches by 1.52 inches.

In embodiments, the device can include dimensions of about 1.5 inches by about 1.9 inches.

The door stop repair device can include door stop mounting plates which can include circular, rectangular, triangular, trapezoidal, hexagon, oval, and/or square shapes.

The door stop repair device can include a raised portion which can include circular, rectangular, triangular, trapezoidal, hexagon, oval, and/or square shapes.

The door stop repair device can also include a raised portion of the door stop mounting plate and includes a circular pad with rounded shoulders.

The door stop repair device can further include a cavity on the underside of the door stop mounting and includes a circular area recessed with a depth of about 0.1 inches.

The door stop repair device further includes an elastomeric retaining element which includes a thickness of about 0.11 inches.

The door stop repair device can also include a door stop mounting plate which includes a thickness of about 16 gauge.

The door stop repair device can further include a perforation which includes a spiral feature configured to allow the door stop screw to engage with the perforation and to secure the door stop to the door stop mounting plate when the door stop screw is fastened to the door stop mounting plate.

In embodiments, the perforation can be formed by a punch through a sheet metal and configured to form a keyway, and/or a spiral path for the screw of the door stop to engage with. The thickness and configuration of the perforation can be designed to allow deformation of the mounting plate as the door stop screw engages their threads through the perforation and as a result of the rotation of the door stop screw through the perforation, a fastening and/or affixing of the door stop to the mounting plate occurs.

According to another aspect of the present invention, the system can include a plurality of plate attachment fasteners. The plate attachment fasteners configured to attach a base plate to a surface of a door or a wall or a surface of a molding. The fasteners can be screws, adhesives, nails, or anchors designed to keep the base plate affixed to the surface of the door, wall, or molding.

According to yet another aspect of the present invention, the system can include a plastic, metal, or expendable medium base plate, wherein the base plate is configured to align with one or a plurality of worn-out screw holes such that the system can position a worn-out hole repair device or devices over the worn-out hole or holes and structured to allow the base plate fasteners to affix the base plate to a surface adjacent to the worn-out holes.

In embodiments, the system can include a thin metal or plastic base plate from about 10 to 40 gauge in thickness.

In embodiments, the device can include metal plates with a thickness of about 0.06 inches.

In embodiments, the repair device can include mounting plates with thicknesses of about 14, 16, and/or 18 gauge.

In embodiments, the system can include a starting hole in about a center and middle of a worn-out hole repair device such that the screw from the original door stop assembly can be placed into the starting hole and by turning the door stop assembly, the screw can engage with the starting hole and fasten the door stop assembly to the base plate.

In embodiments, the system can include a transparent base plate such that after the door stop repair system has been deployed and affixed to a surface of door, wall, or molding, the transparent base plate is not visually detectable at 6 feet away from the surface.

In embodiments, the system can include a base plate wherein the base plate medium can become liquified upon application of pressure and designed such that upon an application of compressive pressure onto surfaces of the base plate, the base plate medium can be evacuated from the volumetric space where it originally existed. This feature is contemplated for use with door hinges wherein the existing dimensions of the door-door jamb interface are not conducive to introducing new materials between previously affixed surfaces.

In embodiments, the system can include spiral cuts, stamped, punched and/or etched opening or openings in a base plate wherein a door stop screw can engage with the base plate and affix the door stop assembly to the base plate.

In embodiments, the fastening mechanisms, and methodologies for affixing the door stop screw to the base plate can include epoxies, thermoplastic polymers, thermosetting polymers, and/or rubber materials arranged to engage with the engagement region of the shank of the door post screw and allow fastening of the door post screw to the base plate to occur.

In embodiments, the system can include plastic, metal, and/or composites which can allow controlled and limited material flow to allow engagement of the door post screw to the base plate.

In embodiments, the system can include an all-in-one plate and anchor. The all-in-one plate and anchor can include a Phillips head slot, torx head slot, hex head slot, flat head slot, or star head slot in about a center of the plate. The entire all in one plate and anchor plate and anchor can then be inserted into the damaged screw hole and the corresponding head slot can be inserted into the damaged hole and then rotated to engage with the damaged hole to provide a receiving central area for the original door stop and corresponding screw or equivalent to be inserted and then screwed in to affix the door stop and corresponding screw to the door or wall surface through the inserted all in one plate anchor.

In embodiments, the system can include 4 perimeter screw holes for corresponding screws or can include selected areas for adhesive attachment between the door or wall surface and the plate surface.

In embodiments, the system can include a central grommet of plastic or rubber that would be positionable inside the main central hole of the plate.

In embodiments, the system can include a plate which can be configured to attach to door stops, mirrors, hooks, and fixtures which can be attached to a door.

In embodiments, the system can include a metal plate, wherein the metal plate can have a central hole. The central hole can include radial central spikes configured to prevent an anchor from turning. The central hole can be configured to accept a plastic anchor.

In embodiments, the system can include a plurality of shaped and sized spikes structured to accept doorstop threads directly.

These and other objects, features, and advantages of the present invention will become more readily apparent from the attached drawings and the detailed description of the preferred embodiments, which follow.

BRIEF DESCRIPTION OF THE DRAWINGS

The features and advantages of the present invention will be better understood when the Detailed Description of the Preferred Embodiments given below is considered in conjunction with the figures provided.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
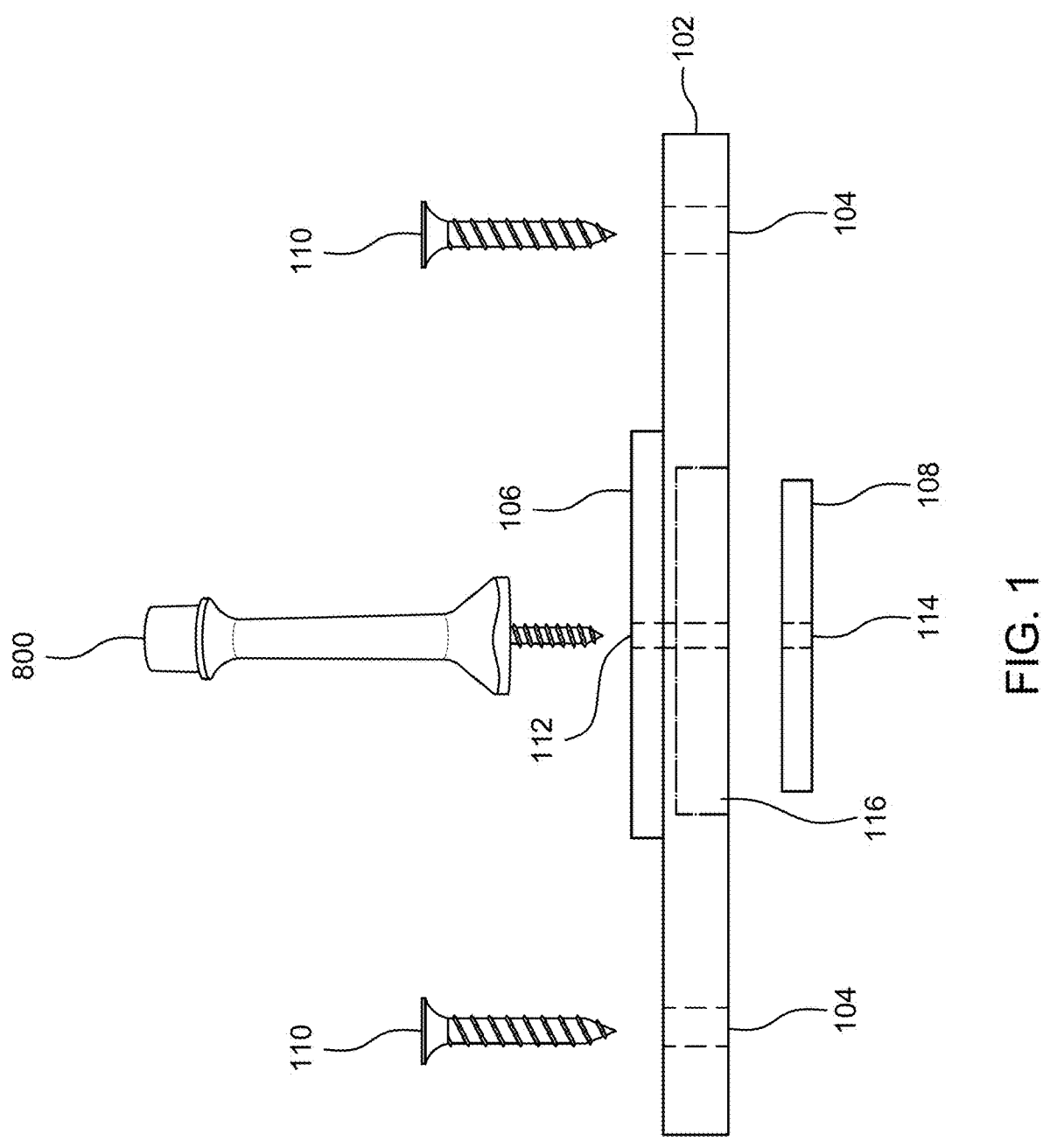
FIG. 1 is a side view of a door stop repair device in an embodiment of the present invention.

As seen in FIG. 1, a side view of a door stop repair device 100 is displayed. The door stop repair device 100 can include a door stop mounting plate 102. The door stop repair device 100 can include four screw openings 104. The device 100 can also include a raised portion 106 configured to allow a surface to surface mating between a bottom portion of a door stop 800 and a top surface of the raised portion 106 of the door stop mounting plate 102. The door stop repair device 100 can also include an elastomeric retaining element 108 configured to allow thread engagement with a screw associated with the door stop 800. The device 100 can further include four securing fasteners 110 configured to secure the door stop mounting plate 102 to a surface using the four screw openings 104. The device 100 can include a through hole 112 through the raised portion 106 and the mounting plate 102. The device 100 can include another through hole 114 in the elastomeric retaining element 108. Additionally, the mounting plate 102 can include a cavity 116 on an underside of the mounting plate 102.

Figure 2:
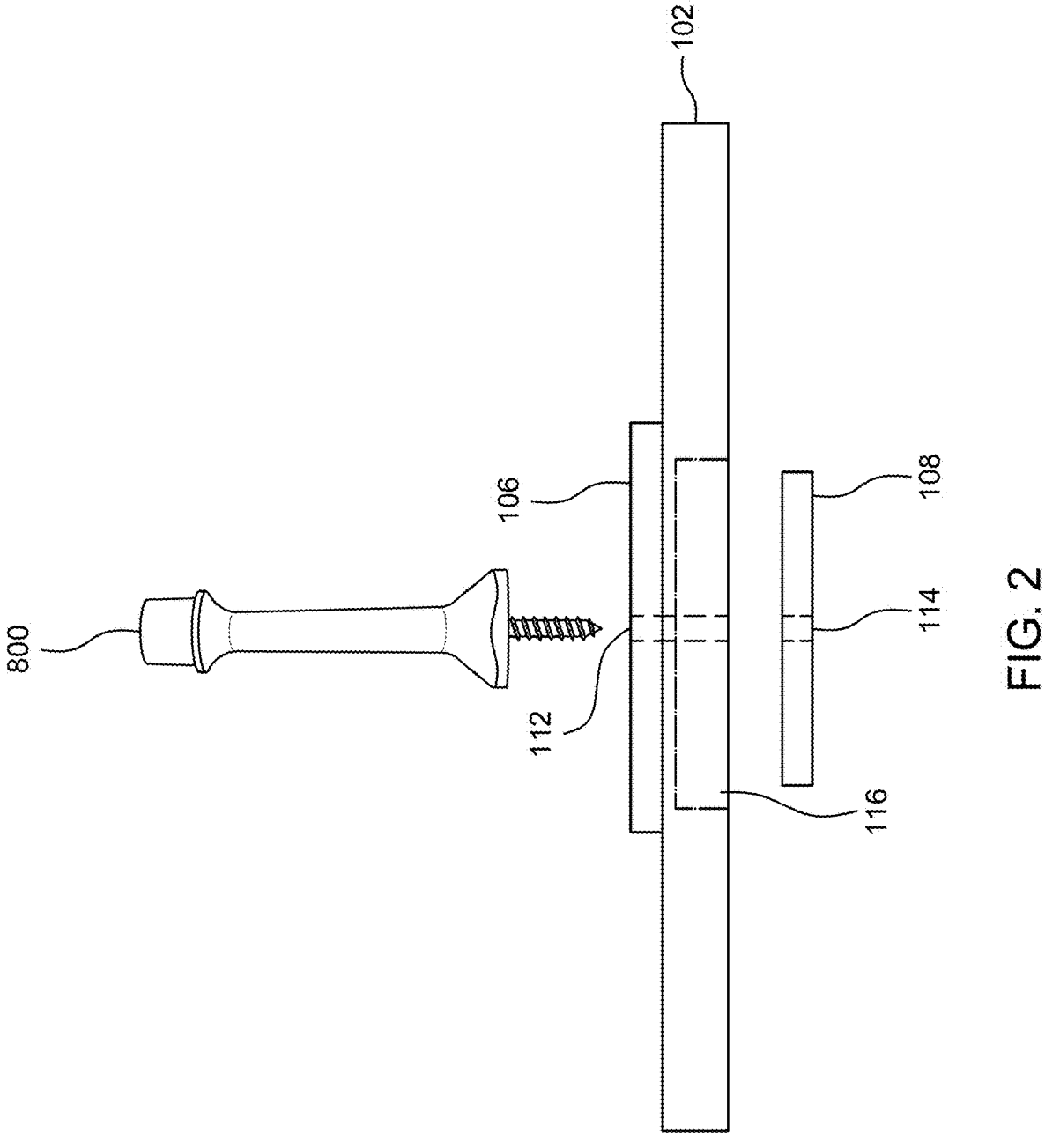
FIG. 2 is a side view of a door stop repair device in an embodiment of the present invention.

FIG. 2 displays a side view of an embodiment of the device 100. In embodiments, the device 100 can be configured for affixing a bottom surface of the mounting plate 102 to an exterior surface with a bonding agent such as an adhesive.

Figure 3:
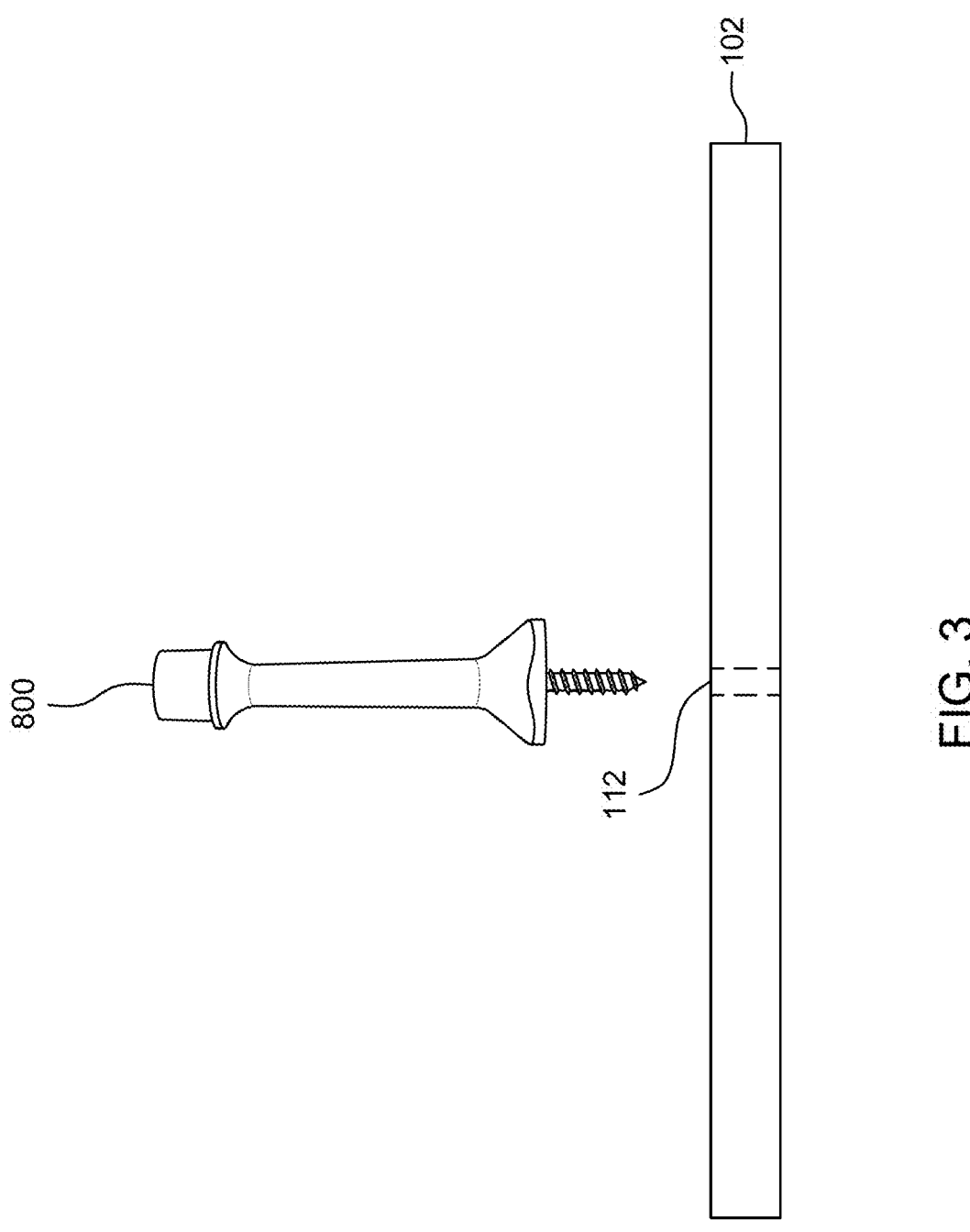
FIG. 3 is a side view of a door stop repair device in an embodiment of the present invention.

FIG. 3 displays a side view of an embodiment of the present invention, wherein the device 100 can include a perforation 118. In embodiments, the perforation can be a penetration in the mounting plate 102 wherein the penetration can be formed by a punch, stamp, and/or other mechanical method whereby the penetration can be configured to be a spiral shaped opening in a top surface of the mounting plate 102. The perforation can further be configured to allow engagement of a door stop screw with the perforation such that the engagement of the screw as it threads through the perforation forms a fastening and/or affixing of the door stop screw to the mounting plate 102 thereby forming a secure fastening between the door stop 800 and the mounting plate 102.

Figure 4:
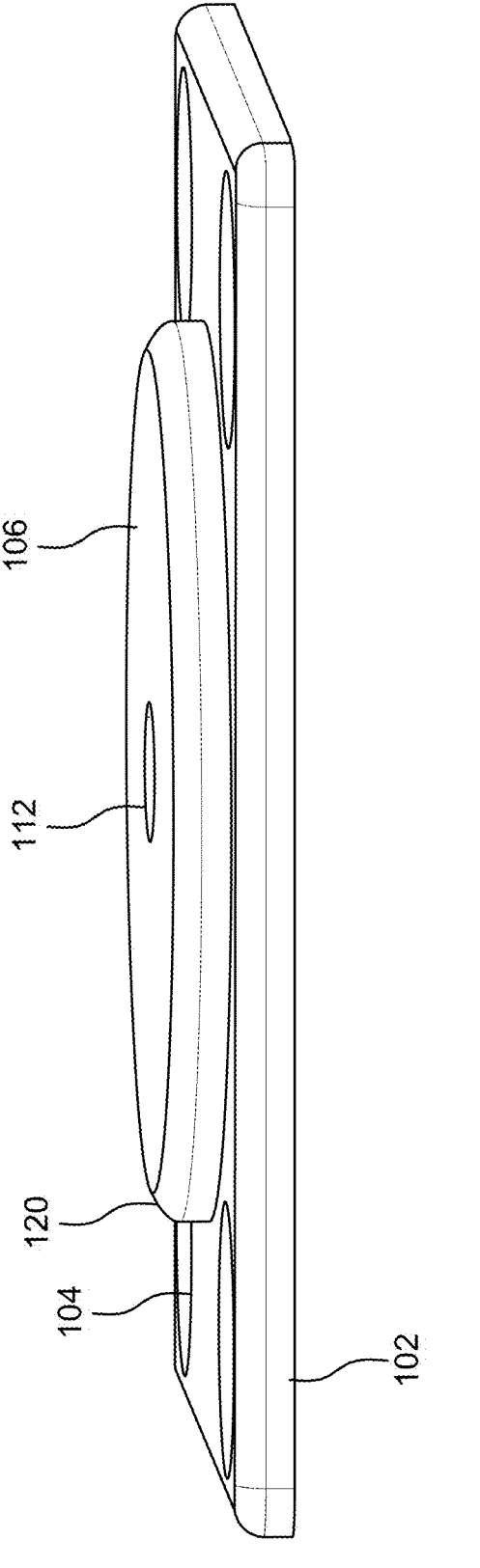
FIG. 4 is a top perspective view of a door stop repair device in an embodiment of the present invention.

FIG. 4 presents a top perspective view of an embodiment of the device 100. The device 100 can further include a raised portion 106 which can also include a circular pad with rounded shoulders 120.

Figure 5:
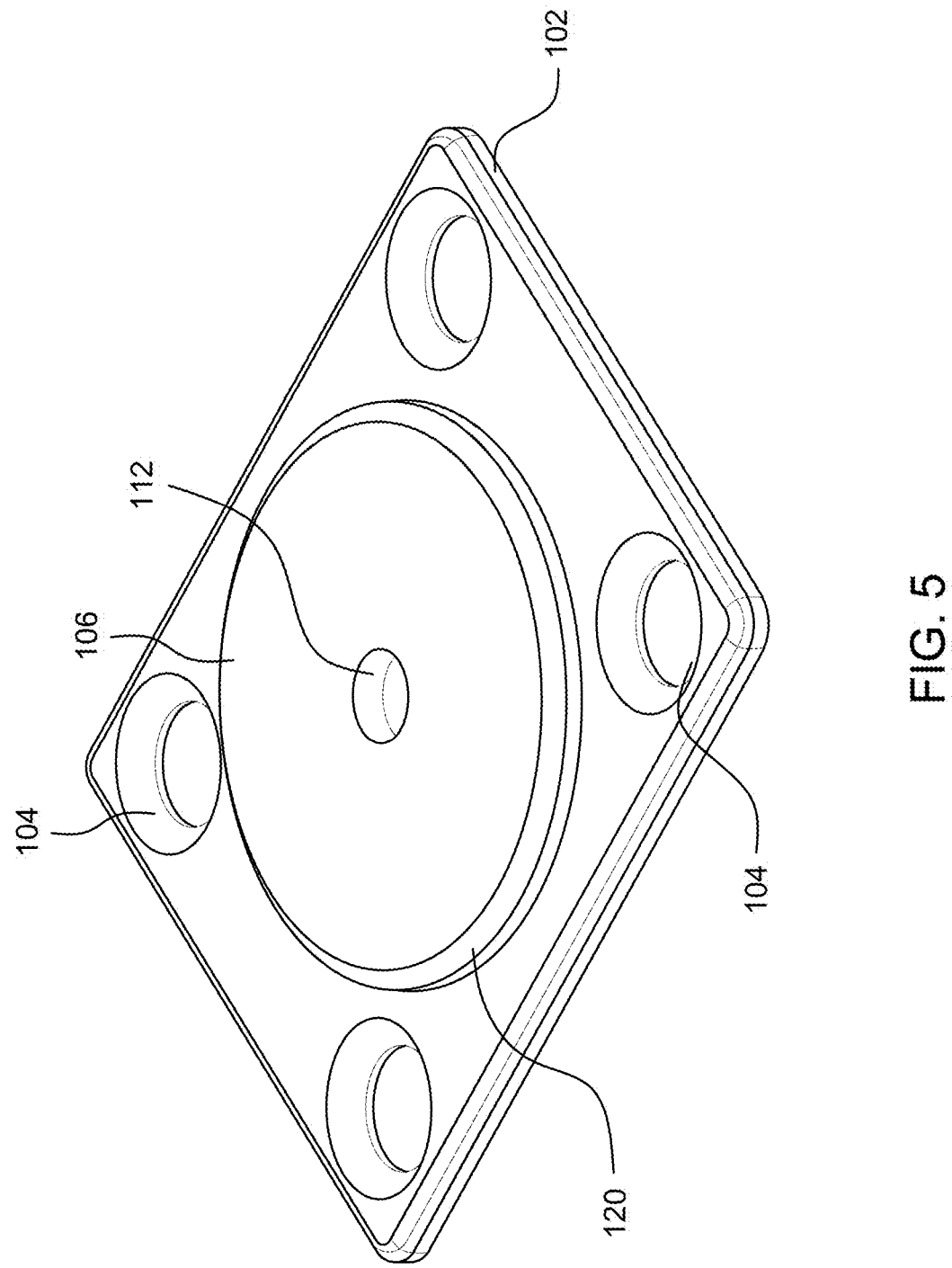
FIG. 5 is a top perspective view of a door stop repair device in an embodiment of the present invention.

FIG. 5 illustrates a top perspective view of an embodiment of the device 100.

Figure 6:
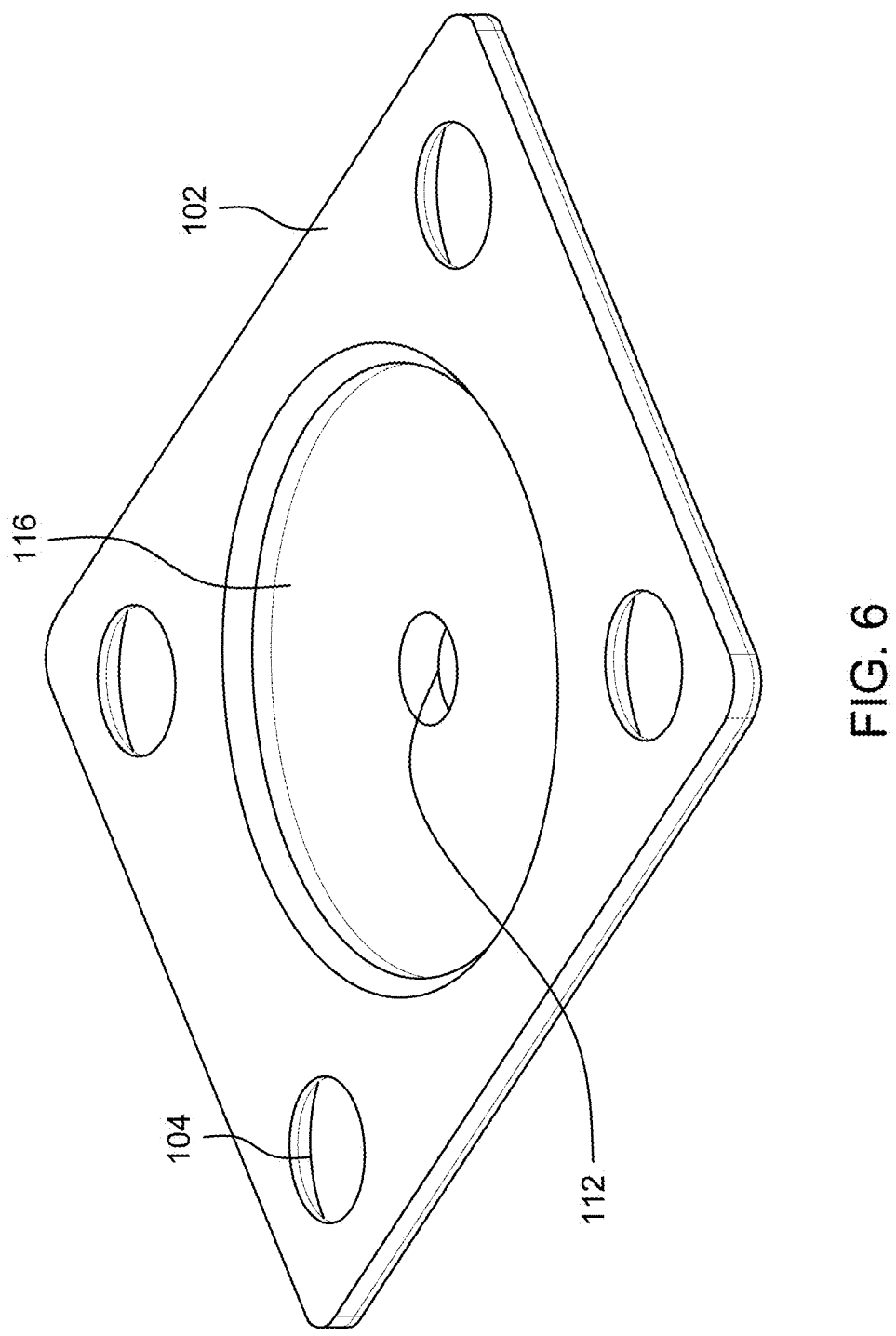
FIG. 6 is a bottom perspective view of a door stop repair device in an embodiment of the present invention.

As best seen in FIG. 6, the device 100 can include a cavity 116 on an underside of the mounting plate 102. The cavity 116 can be configured to house an elastomeric retaining element 108.

Figure 7:
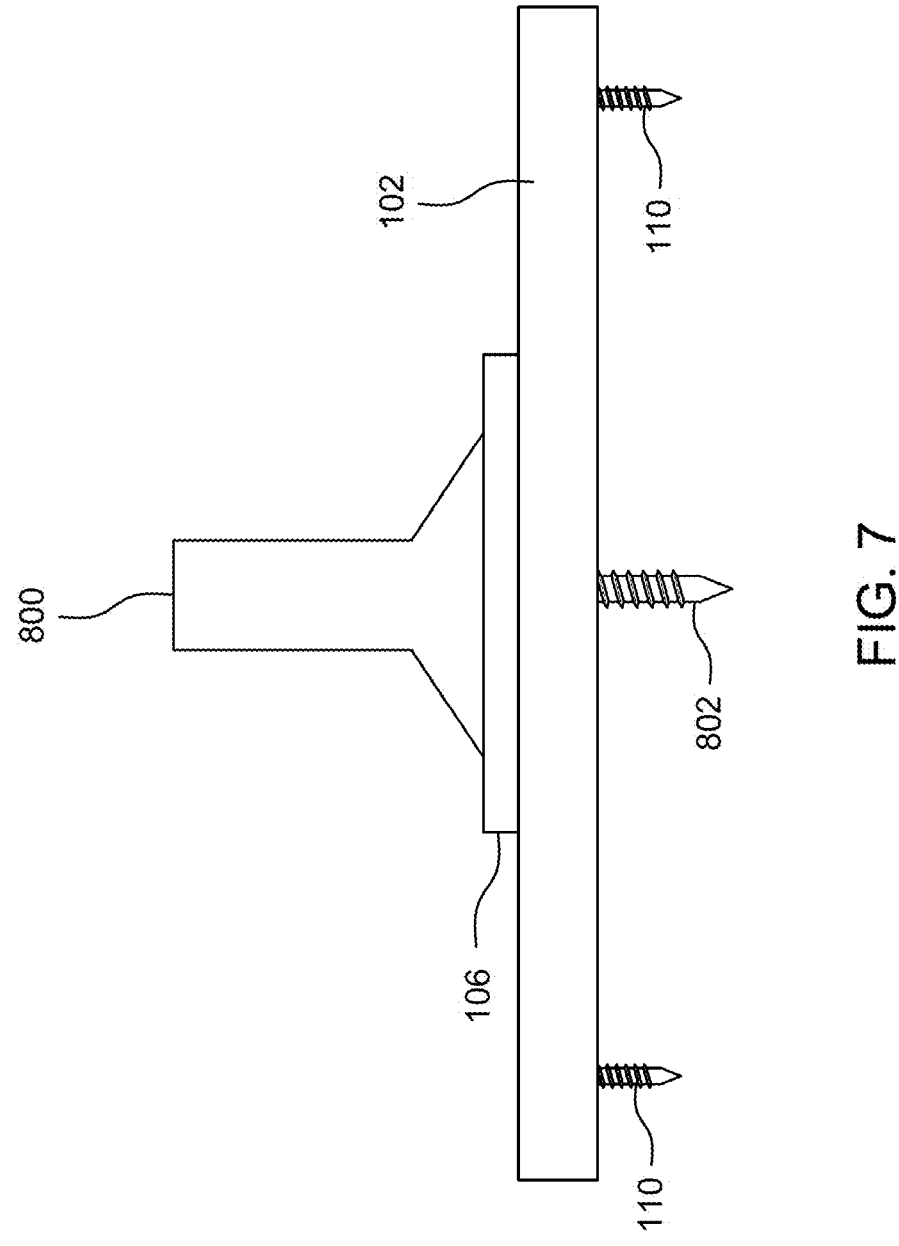
FIG. 7 is a side view of a door stop repair device in an embodiment of the present invention.

Turning to FIG. 7, embodiments of the device 100, as shown is a side view of an assembled device 100, shows the door stop 800 abutting onto a surface of the raised portion 106 of the mounting plate 102. Further, in embodiments, the raised portion 106 of the mounting plate 102 can be affixed to a surface using fasteners 100. The door stop 800 can be secured to the device 100 by having a screw 802 of the door stop 800 engaged with the elastomeric retaining element 114 (not shown) and with the retaining element 114 housed within the cavity 116 (not shown) of on the underside of the mounting plate 102, forms a secured door stop repair device 100 affixed to a surface.

Figure 8:
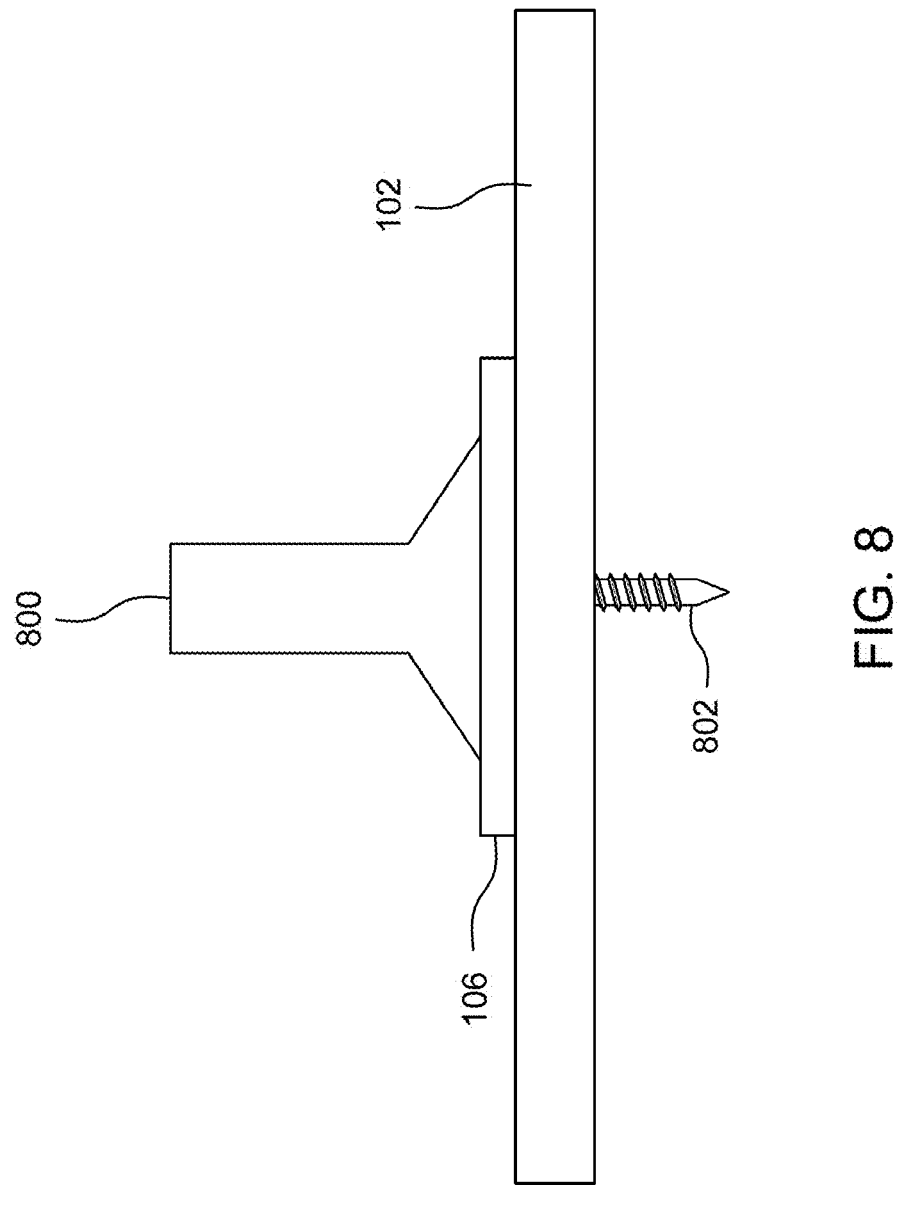
FIG. 8 is a side view of a door stop repair device in an embodiment of the present invention.

FIG. 8 displays the resulting fixed original doorstop 800 placed onto a raised portion 106 of the mounting plate 102. The mounting plate 102 shows it being drawn up against the door stop 800 and the bottom of the door stop screw 802 protruding below the bottom of the mounting plate 102 and prepared to be affixed to a surface.

Figure 9:
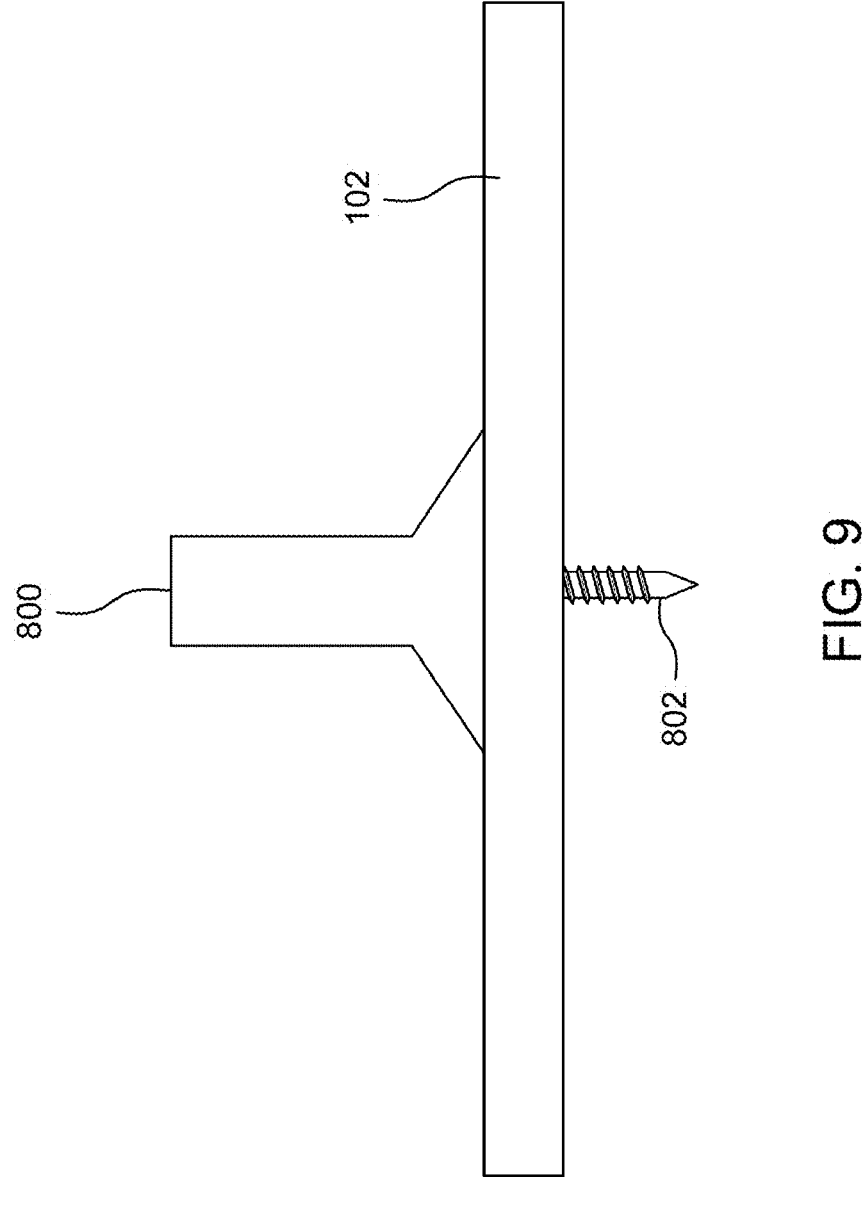
FIG. 9 is a side view of a door stop repair device in an embodiment of the present invention.

FIG. 9 shows a side view of an embodiment of a door stop repair device 100. In embodiments, the door stop 800 can abut a top surface of the mounting plate 102 and affix the door stop 800 to the mounting plate 102 with a screw 802 of the door stop engaging the mounting plate 102 through a perforation 118 (not shown) and through engagement of the screw 802 through the perforation 118 can affix the door stop 800 to the mounting plate 102. The mounting plate 102 can then be affixed to a surface.

Figure 10:
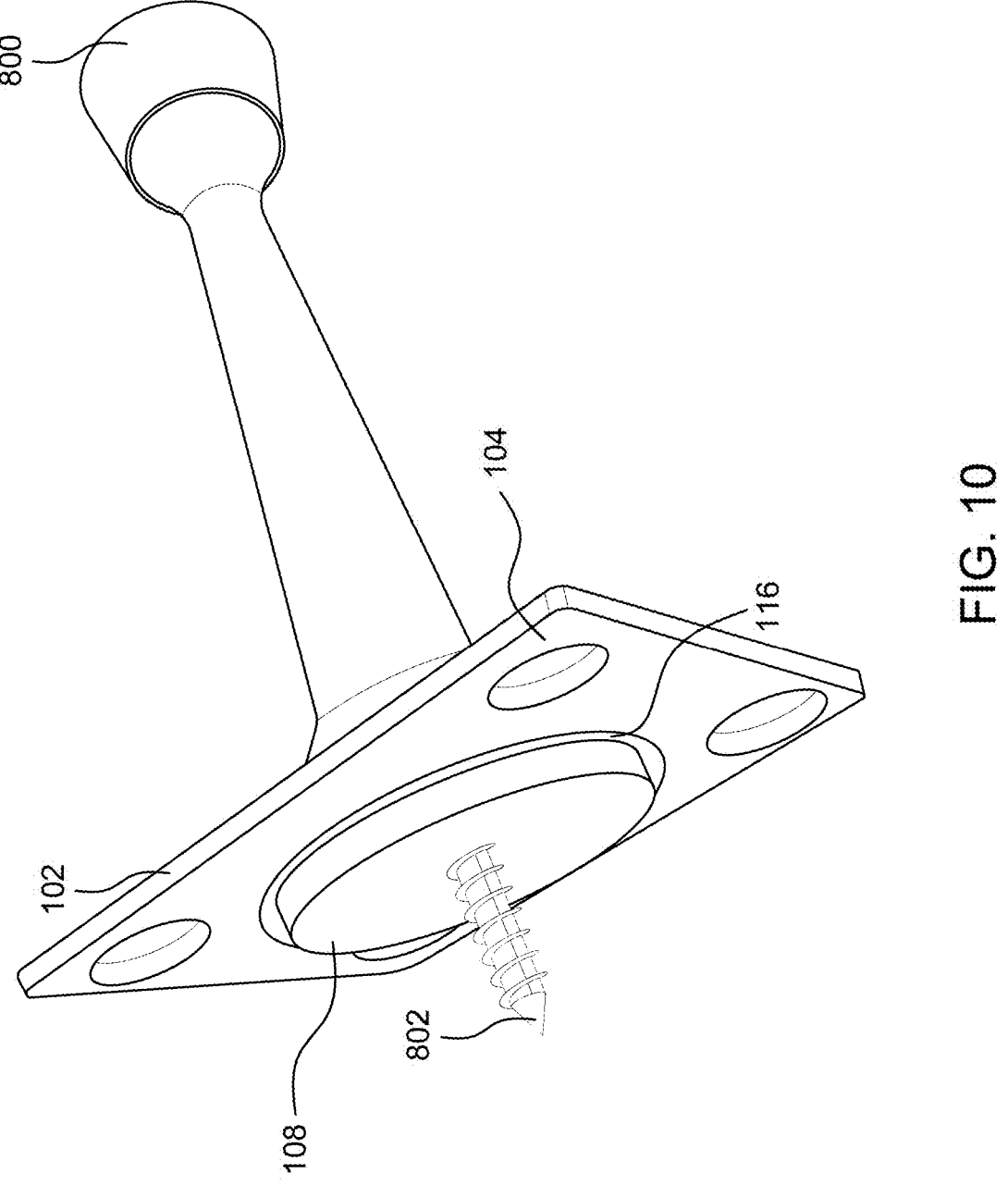
FIG. 10 is a bottom perspective view of a door stop repair device with a door stop attached in an embodiment of the present invention.

FIG. 10 presents a bottom perspective view of a device 100 with a door stop 800 engaged with an elastomeric retaining element 108 with the screw 802 of the door stop 800. In embodiments, the engagement of the screw 802 through the retaining element 114 draws up the retaining element 108 into a cavity 116 on an underside of the mounting plate 102. In embodiments, the drawing up of the retaining element 108 into the cavity 116 secures the door stop 800 to a top side of the mounting plate 102. In embodiments, the mounting plate 102 includes a raised portion 106 (not shown) wherein a top surface of the raised portion 106 abuts onto a bottom surface of the door stop 800.

Figure 11:
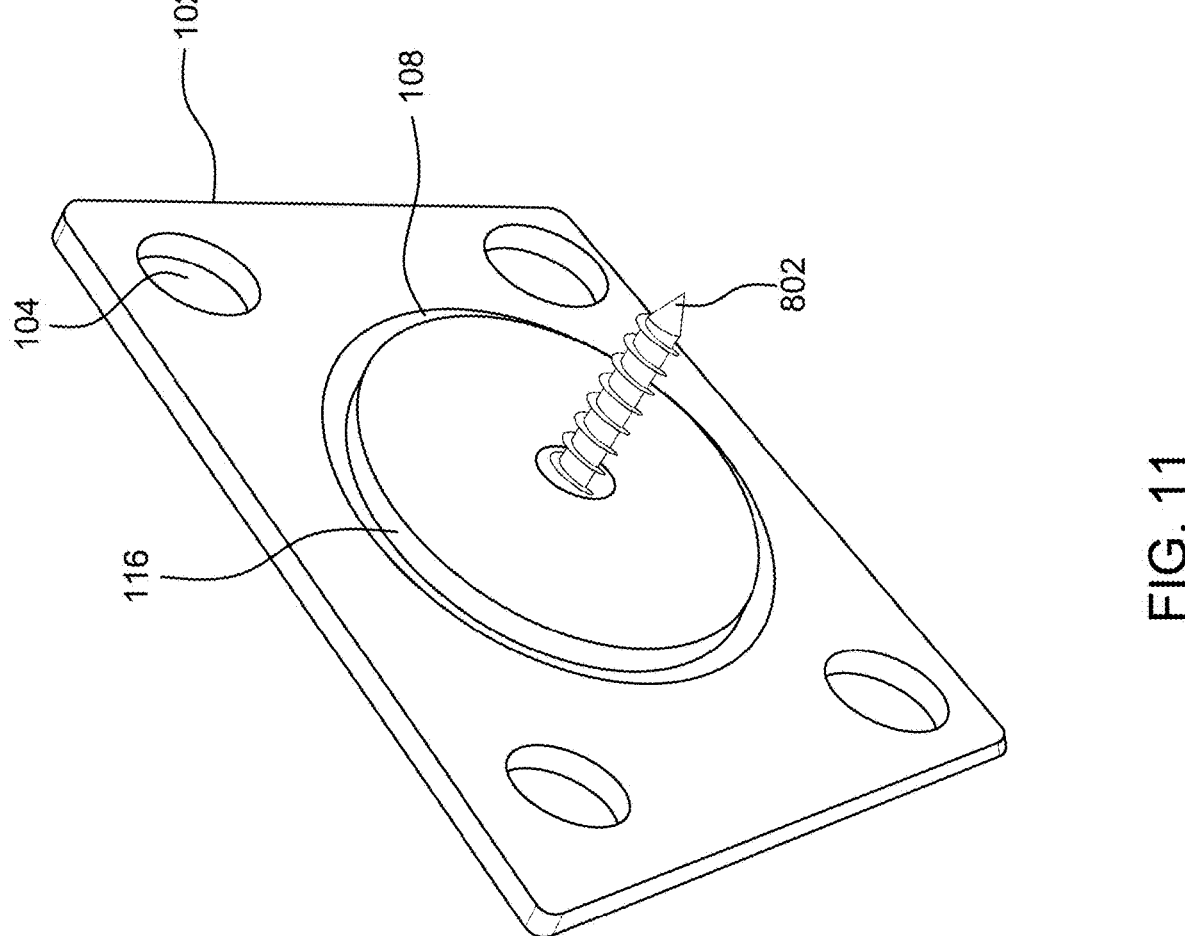
FIG. 11 shows a bottom perspective view of the door stop repair device in an embodiment of the present invention.

Referencing FIG. 11, a bottom perspective view of an embodiment of a door stop repair device 100 is shown. The device 100 can include openings 104, the openings 104 configured to allow fasteners to affix the mounting plate 102 to a surface. In embodiments, the device 100 can include a retaining element 108 engaged with the screw 802 of a door stop 800. The door stop 800 can be affixed to the mounting plate 102 by engagement of the screw 802 with the retaining element 108 and the retaining element 108 drawing up into the cavity 116 on the underside of the mounting plate 102. The openings 104 on the mounting plate 102 can then be utilized to affix the mounting plate 102 to a surface.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

The present invention has been described with reference to the preferred embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of implementation which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

The present invention has been described with reference to the preferred embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

What is claimed is:

1. A door stop repair device suitable for use in utilizing an existing door stop in a location wherein an original door stop screw hole has worn out, the device comprising:
   a door stop mounting plate;
      wherein the door stop plate includes a raised portion, wherein the raised portion is configured to allow a surface-to-surface mating between a bottom portion of a door stop and a top surface of the raised portion of the door stop mounting plate;
      wherein an underside of the door stop mounting plate includes a cavity;
   an elastomeric retaining element;
      wherein the elastomeric retaining element is configured to allow thread engagement with a screw associated with the door stop;
      wherein the elastomeric retaining element is configured to be positionable within the cavity on the underside of the door stop mounting plate; and
      wherein the elastomeric retaining element is further configured to secure the door stop to the door stop mounting plate when the door stop is fastened with the door stop screw to the elastomeric retaining element; and
      wherein the door stop repair device securely holds in place the door stop in or about the original door stop hole location when a bottom surface of the door stop mounting plate is affixed to a surface, the door stop screw is fastened to the elastomeric retaining element, and wherein the elastomeric retaining element is positioned within the cavity on the underside of the door stop mounting plate, forming a secure fastening of the door stop in or about the location of the original door stop screw hole.

2. The door stop repair device of claim 1 wherein the door stop mounting plate includes a plurality of openings, the plurality of openings positionable around edges of the door stop mounting plate; and
   a plurality of securing fasteners, wherein the plurality of securing fasteners are configured to affix the bottom surface of the door stop mounting plate to the surface using the plurality of door stop mounting plate openings.

3. The door stop repair device of claim 1 wherein an adhesive is configured to affix the bottom surface of the door stop mounting plate to the surface.

4. The door stop repair device of claim 1 wherein the raised portion of the door stop mounting plate includes a circular pad with rounded shoulders.

5. The door stop repair device of claim 1 wherein the cavity on the underside of the door stop mounting includes a circular area recessed with a depth of about 0.1 inches.

6. The door stop repair device of claim 1 wherein the elastomeric retaining element includes a thickness of about 0.11 inches.

7. The door stop repair device of claim 1 wherein the door stop mounting plate includes a thickness of about 16 gauge.

\* \* \* \* \*